March 18, 1952    R. O. FERGUSON    2,589,360
RATTRAP
Filed Aug. 31, 1948
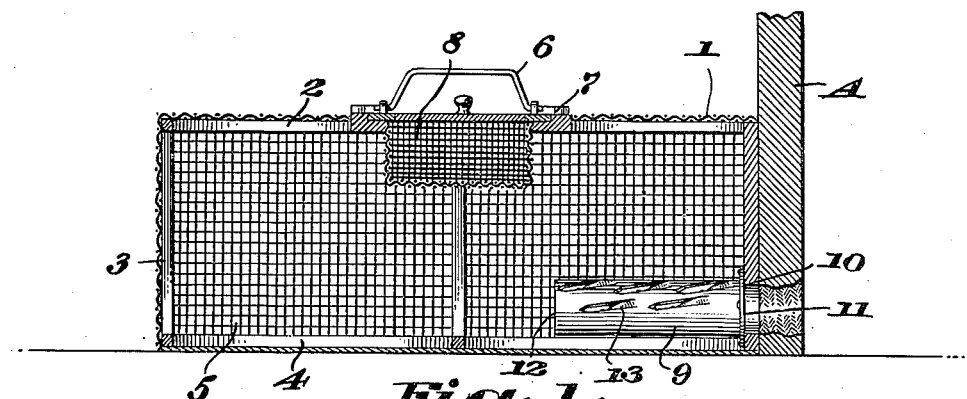
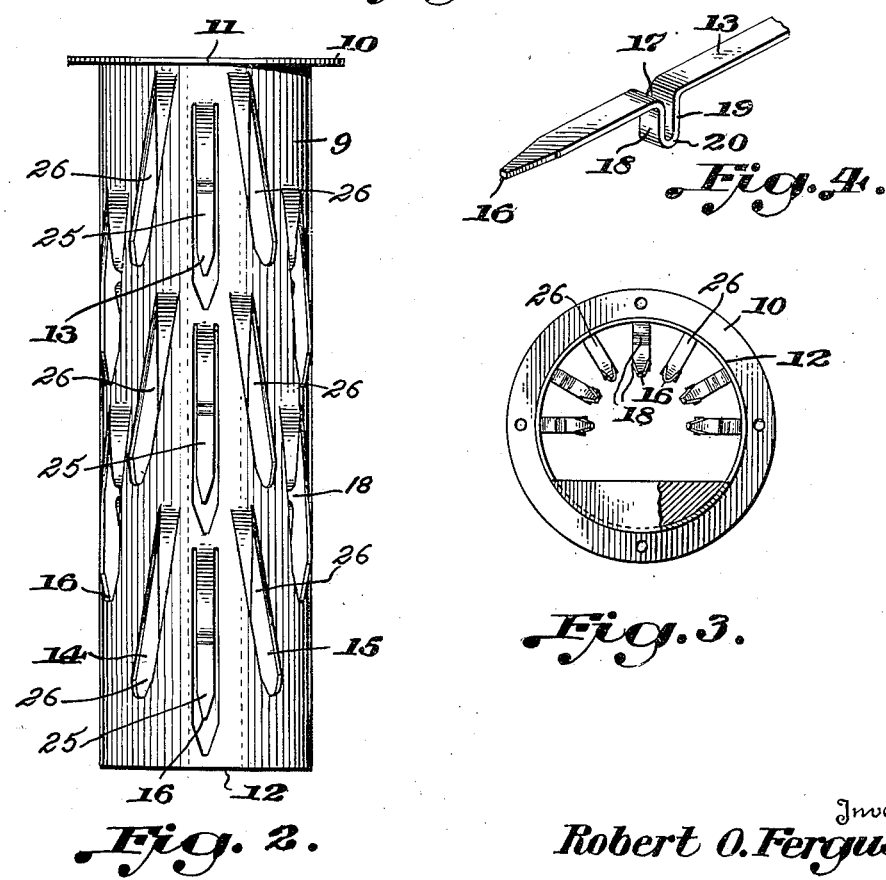
Inventor
Robert O. Ferguson,
By Mason & Mason
ATTORNEYS Patented Mar. 18, 1952

2,589,360

UNITED STATES PATENT OFFICE 2,589,360

RATTRAP

Robert O. Ferguson, Bristol, Tenn., assignor of one-half to Bristol Steel & Iron Works, Inc., Bristol, Va., a corporation of Virginia Application August 31, 1948, Serial No. 46,949

1 Claim. (Cl. 43—65)

This invention pertains to a trap for catching rats, mice and other animals, the invention being particularly addressed to the entrance to the trap.

One object of the invention is to provide a tray having an entrance of a particular construction which allows the entrance of the animal to the trap but prevents the animal's exit therefrom.

A further object of the invention is to provide a trap which may be used time after time without injury to the trap, or to the animals caught by the trap.

An additional object of the invention is to provide a trap having an entrance with prongs of a special construction whereby to prevent the exit of the animal but which will permit the animal to enter the trap without injury to the animal.

A further object of this invention is to provide a trap having an entrance tube provided with a plurality of prongs, only certain of said prongs having sharpened ends and U-shaped portions whereby an animal may withdraw from the tube without being injured unless he passes the exit end of the tube and enters the main body of the trap.

Further objects will appear hereinafter throughout the specification.

In the drawings:

Figure 1 is a vertical sectional view of an animal trap with the novel entrance tube to said trap shown in elevation.

Figure 2 is an enlarged plan view of the entrance tube.

Figure 3 is an end elevation of the tube shown in Figure 2 looking into the exit end thereof, and Figure 4 is a detailed view partly broken away of one of the prongs which are struck from and project into the entrance tube.

As shown in the drawings, A indicates a wall through which a hole has been gnawed. The trap indicated by the numeral 1 is placed against the wall and retained in position so that the entrance to the tube, hereinafter described, forms a continuation of said hole. The trap has a top, ends, sides and a bottom, all supported by suitable braces such as indicated by numerals 2, 3 and 4. These braces may be covered with wire 5 to form said top, ends, sides and bottom.

The trap is provided with a handle 6 attached to a frame 7 mounted in the top, the frame supports the bait holder 8.

The entrance tube 9 which preferably is in the shape of an open ended cylinder, has a collar 10 at one end thereof having a circular rim 11. The collar is provided with apertures for securing the cylinder to the front end of the trap.

The cylinder 9 is further provided with an open exit end 12 and a plurality of struck-up elongated prongs which have been cut, or struck from the sheet metal cylinder 9.

The prongs 13 struck from the top of the cylinder are preferably in a straight line as shown in Figure 2 while those on either side numbered 14 and 15 extend at an angle from the longitudinal axis of the tube. A selected number of prongs, those represented by numeral 25, are each provided with a sharpened end 16 and a U-bend or cam member 17 about half way between the end 16 and the point of attachment to the cylinder. The U-bend is provided with substantially parallel portions 18 and 19, and a lower rounded base 20. The prongs represented by numeral 26 do not have a sharpened end and a U-bend portion.

The fact that all of the prongs do not have sharpened ends and U-bend portions is an important feature of this invention as such permits the animal to withdraw from the tube after partial entry. It is only when the animal passes completely through the tube 9 into the trap that he is prevented by means of the sharpened ends on certain of the prongs from re-entering the tube and escaping.

By referring to Figure 3, it will be noted that the prongs project down into the interior of the tube. Heretofore, when a rat or other animal entered the tube and when it had passed partially through the same, should it decide to back out of the tube, the sharpened end of the prong would pierce its body. This would make the trap useless in catching additional animals, unless all traces of blood were removed from the prongs, as the blood from the animal would remain on the sharpened end of one or more of the prongs and thus warn other animals not to enter the trap.

The tube as herein shown and described, however, will not operate in the above stated manner. Its operation is as follows:

When the animal enters the tube, its back will engage the base 20 of the U-bend 17 of each prong 25 and, due to the sheet metal construction of the prongs, each prong 25 is pushed upwardly a sufficient distance by the animal's body so that the points 16 will not be lowered until the animal is entirely into the trap. Assuming that the animal has partially entered the tube with its head about at the point 16 of the first prong 25, should it decide to back out, point 16 will be kept at an elevated position because the engagement of the base 20 with the animal's back, prevents the point 16 entering its body, and it may back out of the trap. This will insure an entrance tube which is not contaminated and which may be used continuously. Additional prongs 25 will also be raised in this manner, the number of prongs being raised depending upon how far the animal enters the tube. Prongs 26 will not, due to the fact that they are not provided with sharpened ends and U-bends, interfere with withdrawal of the animal after partial entry or cause any injury to the animal. However, prongs 26 will interfere and assist in preventing the re-entry from the trap into the tube 9. Each animal entering the tube will have no warning that another animal has previously entered the tube.

It has been determined after many experiments that animals such as rats frequently injure themselves, after they have partially entered a trap, in trying to get out again. Such injuries, in most cases, cause the drawing of blood when the animal attempts, while partially through the entrance of the trap, to back out of the entrance. Should this occur the trap has to be thoroughly cleaned and all traces of blood removed, in order to be able to catch another animal in the trap. Once the animal, such as a rat, smells blood on the trap entrance, it will not attempt to enter the trap. Because of the improvements above described, the animal cannot injure itself, even should it attempt, after having partially entered the trap, to withdraw from the entrance. This result is accomplished by the use of the specially constructed prongs which project into the entrance to the trap, and their location in the entrance tube.

The cam member 17 is located a distance rearwardly of the point 16, which is about one-half the distance from the point to the connection of the prong to the tube 9, but may be located nearer the point 16. The back of the animal, i. e., the length of back determines the distance of the cam from point 16. In a rat trap, the head of the rat should be past point 16 before the end of the back has passed the cam 17.

This application is a continuation in part of my earlier filed application, Serial No. 553,592 filed September 11, 1944 for Animal Trap now abandoned.

I desire to be limited in the practice of my invention only to the extent as set forth in the appended claim.

I claim:

An entrance tube for an animal trap having an open entrance end and an open exit end in the trap, comprising a plurality of resilient prongs, said prongs projecting toward said exit end, only certain of said prongs having sharpened ends and means on said certain prongs removed from said sharpened ends and adapted for engagement by the back of an animal entering said tube whereby said sharpened ends will be held from engaging and will be moved upwardly by said animal during the time it is entering the tube and until the animal has passed the exit end of the tube, the topmost prongs being arranged in a row longitudinally of said tube and the prongs on each side of said row extending at an angle from the longitudinal axis of the tube, each of said prongs being formed by removed portions of said tube, all of said prongs projecting downwardly toward but not as far as the longitudinal center of the tube, said means on said certain prongs comprising a U-bend with the base of the U-bend extending into the tube, and said base being rounded, said U-bend being positioned substantially half way between said sharpened end and the point of attachment of said certain prongs to said tube.

ROBERT O. FERGUSON.

REFERENCES CITED

The following references are of record in the file of this patent:

UNITED STATES PATENTS

| Number | Name | Date |
|---|---|---|
| 590,032 | Anderson | Sept. 14, 1897 |
| 999,106 | Hagaman et al. | July 25, 1911 |
| 1,234,629 | Clapp | July 24, 1917 |
| 1,388,786 | Albrecht et al. | Aug. 23, 1921 |
| 2,234,985 | Simonds | Mar. 18, 1941 |

FOREIGN PATENTS

| Number | Country | Date |
|---|---|---|
| 278,962 | Great Britain | Oct. 20, 1927 |